United States Patent [19]

Ikuno et al.

[11] 4,235,359
[45] Nov. 25, 1980

[54] APPARATUS FOR WELDING FITTINGS TO A CONTAINER

[75] Inventors: Eiichiro Ikuno, Yokohama; Tomoki Yoshizumi, Ichihara, both of Japan

[73] Assignee: Nittetsu Steel Drum Co., Ltd., Tokyo, Japan

[21] Appl. No.: 49,632

[22] Filed: Jun. 18, 1979

Related U.S. Application Data

[62] Division of Ser. No. 43,097, May 29, 1979.

[51] Int. Cl.$^3$ .............................................. B23K 37/02
[52] U.S. Cl. .................. 228/29; 219/125.11; 219/161
[58] Field of Search ............ 228/29; 219/125.11, 219/161

[56] References Cited

U.S. PATENT DOCUMENTS

| | | |
|---|---|---|
| 3,207,408 | 9/1965 | Thome et al. .............. 228/29 |
| 3,513,286 | 5/1970 | Puls .................... 219/125.11 |

FOREIGN PATENT DOCUMENTS

625873  9/1978  U.S.S.R. ................... 228/29

*Primary Examiner*—Francis S. Husar
*Assistant Examiner*—K. J. Ramsey
*Attorney, Agent, or Firm*—Wenderoth, Lind & Ponack

[57] ABSTRACT

A light-gauge metal container has a closure flange fixed to a container wall, to which a closure plug is detachably screwed. An inwardly projecting cylindrical neck is fastened to the edge of a closure flange receiving opening made in the container wall. The closure flange is inserted in the opening so that the inward ends of the flange and neck flushed with each other, with an annular face formed by the flushed flange and neck ends circularly edge-welded. In manufacturing the container, the closure flange is press-fitted in the receiving opening, with the annular face held in the horizontal position. The assembly is transferred to welding apparatus, and positioned roughly first, then exactly by mating the flange opening with a vertical reference shaft on the welding apparatus. The annular face is edge-welded by rotating a welding torch about the axis of the reference shaft.

1 Claim, 15 Drawing Figures

APPARATUS FOR WELDING FITTINGS TO A CONTAINER

This application is a division of copending application Ser. No. 43,097, filed May 29, 1979.

BACKGROUND OF THE INVENTION

This invention relates to a metal container, such as a light-gauge metal container, having a closure flange, adapted to receive a threaded plug, fixed on a container wall. More particularly, it relates to an apparatus for fastening the closure flange to the container wall.

Figure 1:
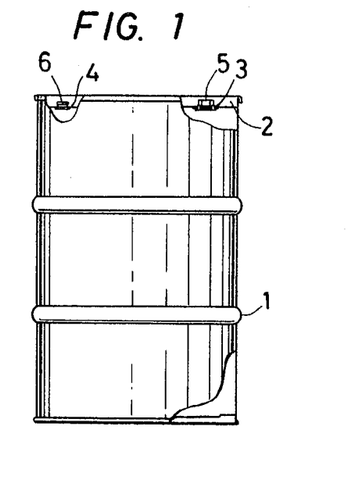
FIG. 1 is a side elevation, partly in section, showing a steel drum, which is an example of metal containers to which this invention is applied, with a closure flange fastened to a top head and a plug screwed into the flange.

Most of larger-capacity, e.g., 5 gallons and above, light-gauge metal containers have openings in a container wall to get the contents and air in and out. Each opening carries a closure flange into which a threaded plug is screwed. FIG. 1 shows a steel drum. A top head 2 fixed to a body 1 is fastened with a bung flange 3 and a vent flange 4, with both flanges screwed with threaded plugs 5 and 6. The following description will be made with reference to a steel drum carrying closure flanges on the top head.

According to a conventional method disclosure by U.S. Pat. No. 3,863,800, for example, a cylindrical closure flange neck is fitted in an opening neck on the top head. The closure flange is fixed to the top head by outwardly curling the uppermost end of the flange neck. Sealing is effected by inserting a gasket between the two necks. Another method according to U.S. Pat. No. 3,393,823 double seams top head opening and cylindrical closure flange necks, with a gasket interposed therebetween.

The closure flange thus fastened to the top head by curling or double-seaming may loosen when a shock is given to it during the transportation or handling of the drum or the plug is screwed in with excess force. Some materials contained in the drum may erode the gasket, which results in leakage of the contents. Not going so far as to cause leakage, the dissolved gasket may contaminate or deteriorate the contents.

Figure 2:
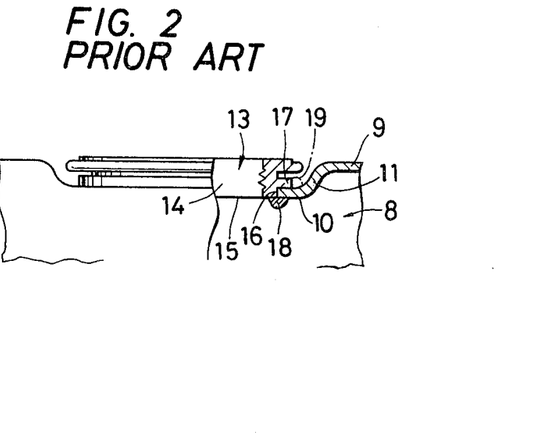
FIG. 2 is a partially cross-sectional view showing an example of conventional metal containers in which a closure flange is welded to a container wall.
Figure 3:
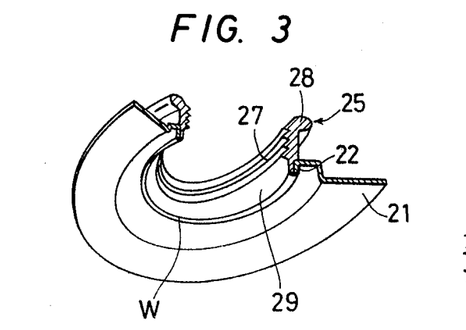
FIG. 3 is a perspective view, with a part thereof cut open, showing an embodiment of this invention in which a closure flange is welded to a container wall.

To solve these problems, or to provide adequate strength demanded of containers for radioactive substances, some drums have the closure flange welded to the top head, as shown in FIG. 2. As seen, a top head 9 of a drum 8 has an opening to receive a closure flange 13, with the edge of the opening leveled off. The lower portion of a cylindrical body 14 of the closure flange 13 is inserted in the opening. The bottom surface 15 of the inserted body and the lower (internal) surface 10 of the top head 9 are flushed. Welding 18 is given along a circular seam 16 at which the circular surface of the opening in the top head 9 and the lower periphery of the closure flange 13 contact.

The top head 9 with this closure flange 13 has the flattened opening edge, with the lower surface of the top head and the bottom surface of the closure flange flushed with each other. Accordingly, excess stress may cause a leaky crack in the vicinity of the seam 16. Also, welding heat may deform the entire closure flange to impair the fitness of the threaded portion.

According to another welding method, fillet welding 19, indicated by a dot-dash line in FIG. 2, is given to join the upper surface 11 of the opening edge in the top head 9 to the periphery of an annular projection 17 on the closure flange 13. This structure also involves the same defects as the preceding one. What is worse, the increased welding length increases not only the welding cost, but also the incidence of such defects and the intensity of their effects.

Metal containers usually are mass-produced (for example, one plant manufactures 100-thousand drums monthly), on the automatic assembly line. It is therefore desirable that welding of the closure flange to the drum body be incorporated in the manufacturing line. To permit this incorporation, it is essential that high-quality welding parts be used, welding position determined quickly and accurately, welding completed in a short time, and welding operation automated readily.

SUMMARY OF THE INVENTION

This invention provides a solution for the aforementioned difficulties with metal containers.

An object of this invention is to provide a metal container that has a closure flange firmly fastened to a container wall, and dispenses with gasket and leakage from the joint.

Another object of this invention is to provide a metal container that has a closure flange fastened to a container wall by rigid, efficient welding.

Yet another object of this invention is to provide a readily automatable method and apparatus for manufacturing a metal container that permit welding a closure flange to a container wall with high efficiency.

To achieve the above-described objects, a light-gauge metal container, with a closure flange fastened to a container wall to receive a detachable plug, according to this invention is characterized by having a cylindrical neck formed along the periphery of a closure flange receiving opening in a container wall so as to stand substantially perpendicular to the container wall and project inward, a closure flange inserted in the opening so that the bottom faces of a cylindrical leg, formed in the lower portion of the closure flange, and the neck are flushed with each other, and an annular face, formed by the bottom faces of the cylindrical neck and leg, fused by edge welding.

In the above-described metal container of this invention, the closure flange is rigidly secured to the flange receiving opening, with the cylindrical neck along the opening periphery and the cylindrical leg of the closure flange inserted therein forming a double-cylinder structure. Further, the edge-welded face uniting the lower ends of the cylindrical neck and leg is leakproof. There is no risk of contaminating the contents with gasket, too.

A method of manufacturing the metal container according to this invention comprises forming a cylindrical neck along the periphery of a closure flange receiving opening in a container wall so as to stand substantially perpendicular to the wall and project inward, press-fitting a closure flange in the opening so that the lower ends of the neck and the cylindrical leg of the closure flange form a flush annular face, transferring the container assembly, carrying the closure flange press-fitted in the opening with the annular face held in the horizontal position, to welding apparatus, putting the assembly in approximate position on the welding apparatus, putting the assembly in exact position by mating the flange opening with a vertical reference shaft on the welding apparatus, and edge-welding the annular face by rotating a welding torch about the axis of the reference shaft.

The manufacturing method according to this invention permits quickly and accurately edge-welding the narrow annular face formed by the cylindrical neck along the periphery of the closure flange receiving opening and the cylindrical leg of the closure flange. Operations based on this method are easy to automate, too.

BRIEF DESCRIPTION OF THE DRAWINGS

FIGS. 13 and 14 are cross-sectional views illustrating the operation of the embodied apparatus; FIG. 13 shows a top head roughly positioned on the apparatus, and FIG. 13 shows a closure flange being welded to the exactly positioned top head.

DETAILED DESCRIPTION OF THE PREFERRED EMBODIMENTS

Embodiments of this invention will be described hereunder using a steel drum as an example of metal containers.

Figure 4:
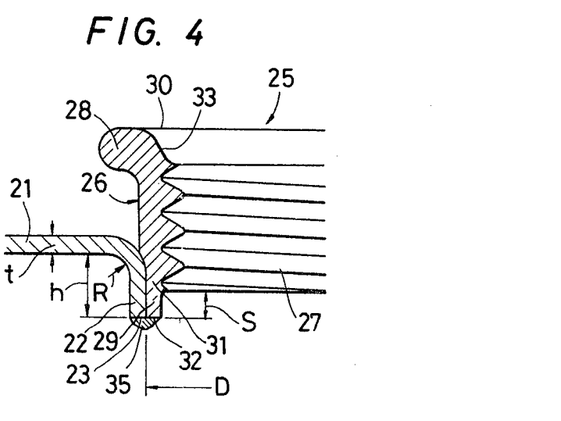
FIG. 4 is a cross-sectional view of the container wall and closure flange in FIG. 3.

FIGS. 2 and 4 show a first embodiment in which a closure flange is welded to a top head according to this invention. A closure flange receiving opening is punched in position in a top head 21 of light-gauge steel sheet (e.g., 0.29 to 1.6 mm thick). As shown in the drawings, the peripheral edge of the opening is bent downward (or toward the inside of the drum) to form a cylindrical neck 22. The inside diameter D of the opening depends on the size of a closure flange 25. The preferable diameter D is such that a tight fit is attained between the opening and the closure flange 25. Considering the bending work and the assurance of the tight fit between the opening and closure flange, the appropriate height h of the neck 22 is approximately 2 to 5 mm. Related with the bending work and the neck height, the appropriate radius of bend R at the base of the neck is approximately 0.5 to 2 mm. The neck 22 forms an angle of substantially 90 degrees with respect to the surface of the top head 21. But if the angle is such that the inside diameter D decreases slightly progressing downward, the closure flange 25 can be inserted in the opening more easily and the inserted flange 25 held therein more tightly.

The closure flange 25 comprises a cylindrical body 26, which in turn comprises a threaded portion 27, having a screw thread cut on the inner surface, an unthreaded top 28, and a cylindrical leg 29 extending below the threaded portion 27. The top 28 is somewhat funnel-shaped, with a surface 33 between a top surface 30 and the threaded portion 27 contacting a gasket when a plug is screwed in. To maintain heat balance during welding, the thickness of the leg 29 should preferably be equal to the thickness t of the top head. Considering the radiation efficiency during welding, the appropriate length S of the leg 29 is approximately 1 to 2 times the thickness t of the top head. The lower portion of the body 26 constitutes an insert 31 including the leg 29. The outside diameter of the insert 31 is slightly reduced, with the upper portion thereof curved so as to fit close to the curved surface of the neck 22.

The closure flange 25 is press-fitted in the above-described receiving opening in the top head 21. The closure flange 25 is pushed in until it stops, with the curved portion of the insert 31 coming in contact with the curved surface of the neck 22. Then, the lower end 23 of the neck 22 and the lower end 32 of the leg 29 are flushed, and a tight fit is attained between the insert 31 of the closure flange 25 and the receiving opening.

With the closure flange 25 inserted in the opening in the top head 21, the neck bottom 23 and the leg bottom 32 from a narrow annular face, and circular edge welding is given so that a bead 35 is formed across the entire width of the face. Both arc and gas welding may be used. TIG (tungsten inert gas) welding is more preferable because of higher welding workability and quality. A single layer of the bead 35 is sufficient.

The edge of the top head, to which the closure flange has been welded as described above, is double seamed or welded to a body to complete a drum, as shown in FIG. 1.

This invention insures a rigid structure in the vicinity of the closure flange receiving opening, forming a double-cylinder structure with the cylindrical neck bent along the periphery of the opening and the closure flange tightly press-fitted therein. The edge-welded narrow annular face formed by the neck and flange ends does not permit the leakage of the contents even when the neck or closure flange has been deformed. The simply shaped neck and closure flange do not call for complex press and machine work, and avoid waste of their material.

Figure 5:
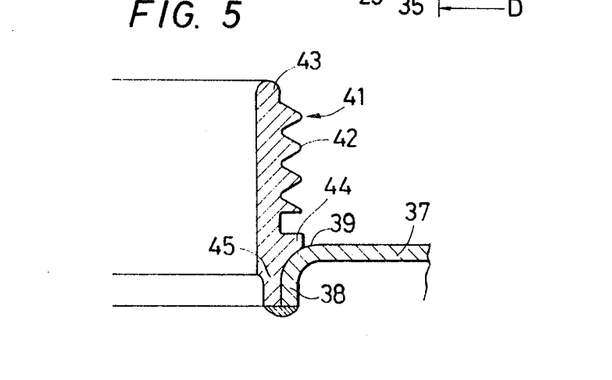
FIG. 5 is a cross-sectional view of a closure flange welded to a container wall in another embodiment of this invention.

FIG. 5 shows another embodiment of this invention. This invention differs from the first one only in that a closure flange 41 has a screw thread 42 cut on the outside surface thereof, a straight cylindrical upper portion 43, and an annular projection 44 in the lower portion. The annular projection 44 lies above an insert 45 to secure the closure flange 41 in the receiving opening, bringing a wide area of the peripheral surface of the insert 45 in contact with a curved surface 39 of a neck 38 on a top head 37.

Figure 6:
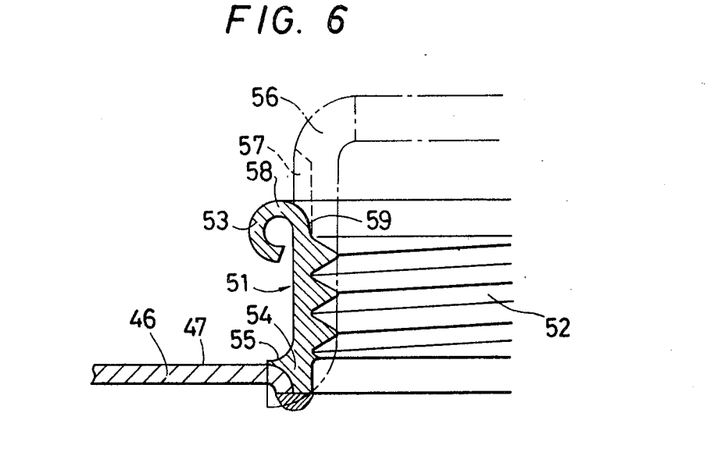
FIG. 6 is a cross-sectional view of a closure flange welded to a container wall in yet another embodiment of this invention.

FIG. 6 shows yet another embodiment of this invention. The upper portion of a closure flange, above a threaded portion 52, is arched outward to form a curled portion 53. A surface 59 between the top surface of the curled portion 53 and the threaded portion 52 contacts a gasket. The archedly curled portion 53 increases the rigidity of the upper portion of the closure flange. An annular projection 54, triangular in cross-section, is provided in the lower portion of the closure flange. This projection 54 functions like the projection in the second embodiment. In addition, a curved top surface 55 forms a smooth, non-disfiguring joint with the top surface 47 of the top head.

A dot-dash line in FIG. 6 indicates an in-process piece 56 that is to be finished into the closure flange 51. The in-process piece 56 is made of a mild steel plate, of the same quality as the top head 46, which is punched and drawn into a cylindrical shape.

The threaded portion 52 and annular projection 54 are machined on the drawn in-process piece 56. As indicated by a dotted line, the upper portion is made into a cylinder 57 of reduced thickness, which is then arched outward into the curled portion 53. The closure flange of this embodiment can be manufactured easily, using only a limited quantity of material.

The following paragraphs describe a method and apparatus for welding together the above-described top head and closure flange rigidly and efficiently.

According to this invention, a top head blank is cut away from a steel sheet in coil, a closure flange receiving opening is made in the blank, a closure flange is inserted in the opening, and a annular joint formed by the top head and the closure flange is welded.

The top head carrying the closure flange is transferred to welding apparatus, with the annular joint held in the horizontal position. In this transfer stage, the top head is not exactly positioned with respect to a welding torch. To put the annular joint, whose width is as narrow as 1 to 4 mm, in the exact welding position (i.e., just under the welding torch), the top head should be moved and stopped with high accuracy. Positioning becomes more difficult as the size of the top head increases, as with steel drums. Accordingly, the transferred top head is only roughly positioned first on the welding apparatus.

Then, a vertical reference shaft is inserted in the opening in the closure flange so that the shaft and flange come in direct or indirect contact with each other. By this means, the top head, if dislocated, is moved back and forth and/or right and left into the accurate position. The welding torch is fastened to the reference shaft at a distance. On mating the opening in the closure flange with the reference shaft, therefore, the joint is exactly positioned with respect to the welding torch. The simple procedure of inserting the reference shaft in the closure flange opening assures quick positioning.

When the top head has thus been set on the welding apparatus, the welding torch is rotated about the reference shaft to weld the joint. Arc, gas and other welding methods can be employed.

Next, the welding method according to this invention will be described more concretely by reference to an embodiment of the apparatus briefed above. The description covers a case in which two closure flanges are welded to the top head of a steel drum.

Figure 7:
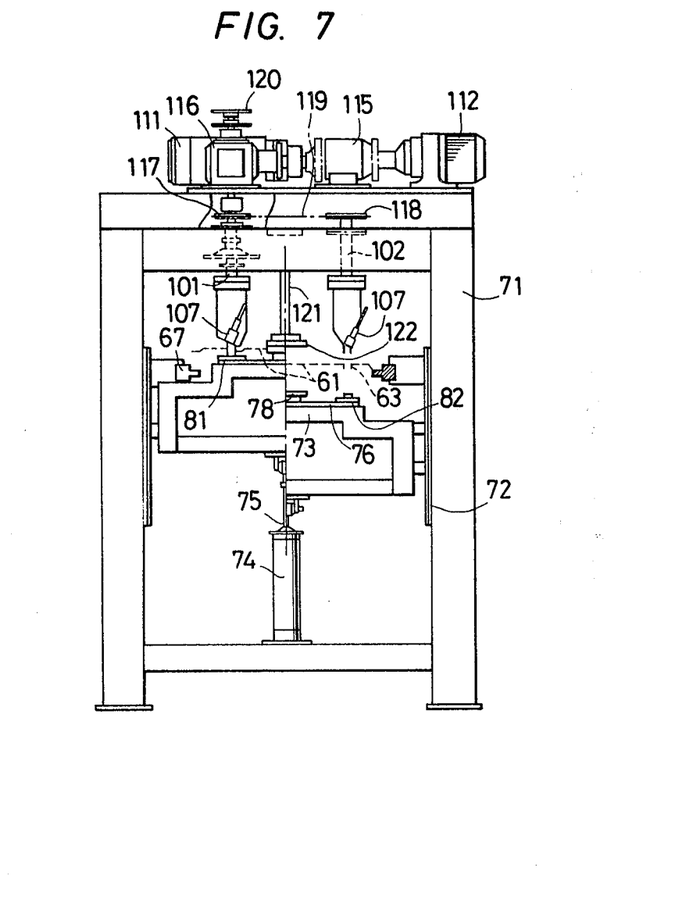
FIGS. 7, 8 and 9 are a front, a plan and a side elevational view of an embodiment of welding apparatus for operating the method of this invention.
Figure 8:
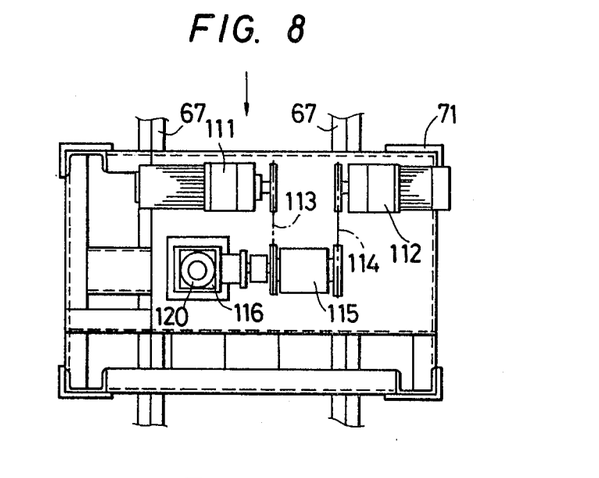

FIGS. 7 and 8 are overall views of welding apparatus that is incorporated in a steel drum manufacturing line. As shown in the drawings, horizontal carrying apparatus (such as a belt conveyor) passes through a frame 71. This carrying apparatus 67 conveys a top head 61 with closure flanges 63 from the preceding process to the welding apparatus, and the welded top head 61 to the subsequent process.

The frame 71 holds a clamp table 73 that moves up and down along a guide 72. A rod 75 of an air cylinder 74, which raises and lowers the clamp table 73, is connected to the bottom of the clamp table 73. A mount 76 is provided on top of the clamp table 73, with an insulator 77 (see FIG. 13) therebetween. The mount 76 supports a top head support 78 in the center, and clamps 81 and 82 at both ends. The positions of the clamps 81 and 82 correspond to those of the closure flanges 63 fitted in the top head 61.

Figure 10:
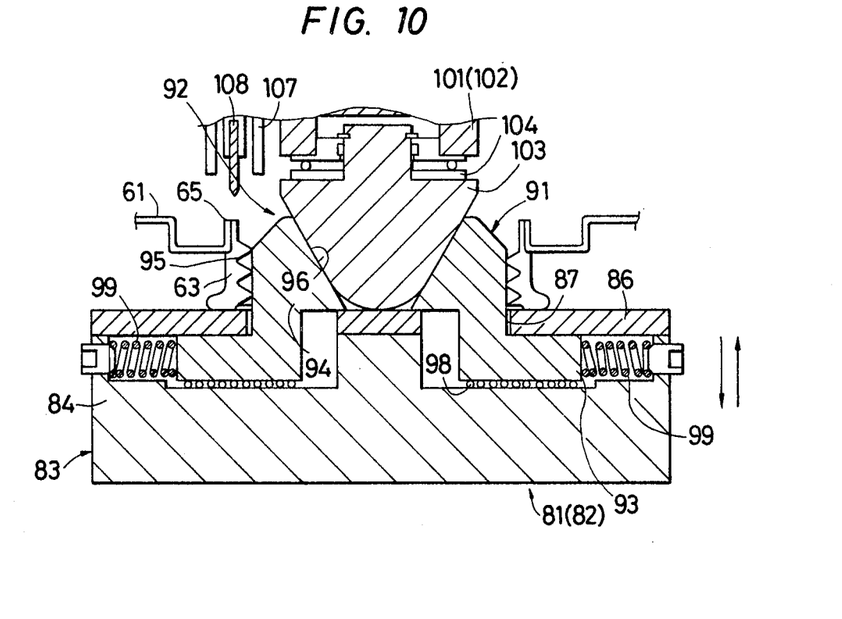
FIGS. 10 and 11 are a cross-sectional and a plan view enlarging a clamp in the embodiment of FIG. 7.
Figure 11:
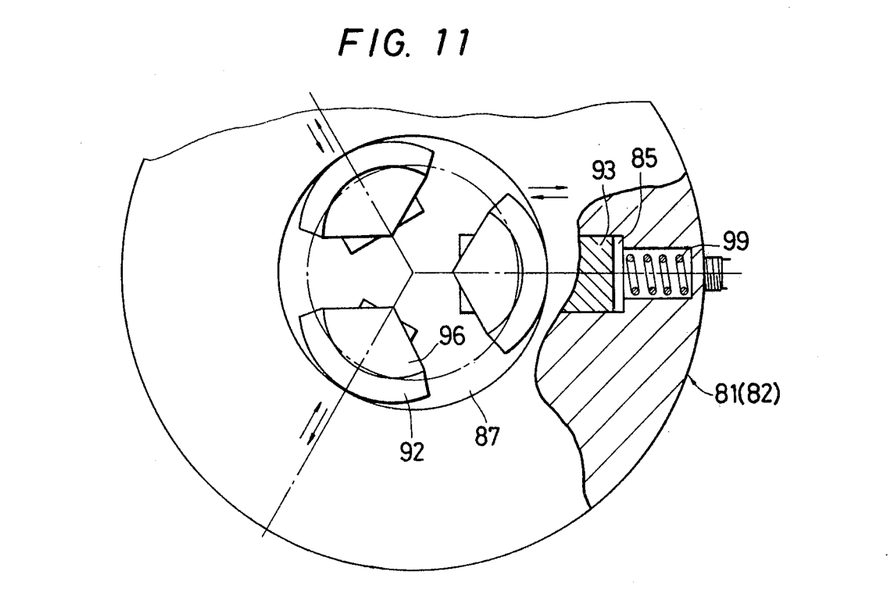

FIGS. 10 and 11 show details of the clamps 81 and 82. The following description deals with the clamp 81 at the left, with which the clamp 82 at the right is identical. The clamp 81 comprises a clamp proper 83, which comprises a disk-like base 84 and a keep plate 86 having a circular opening 87 in the center, and a three-piece claw 91 fastened to the clamp proper 83. The base 84 has three radially extending guide grooves 85 disposed at angular intervals of 120 degrees. The base 93 of each claw 92 is fitted in the guide groove 85, with the upper surface of the base 93 held down by the keep plate 86. The claw 92 has a centering part 94, with a cylindrical outside surface 95 and a conical inside surface 96 converging toward the center, projecting upward from the base 93. Rollers 98 are provided between the base 84 and the bottom of the claw base 93 to facilitate the movement of the claw 92. A coil spring 99 is interposed between the base 84 and the outward end of the claw base 93 to keep the claw 92 pressed toward the clamp center. The three claws 91 thus disposed form a conical receiving cavity 97 (see FIG. 13).

Figure 9:
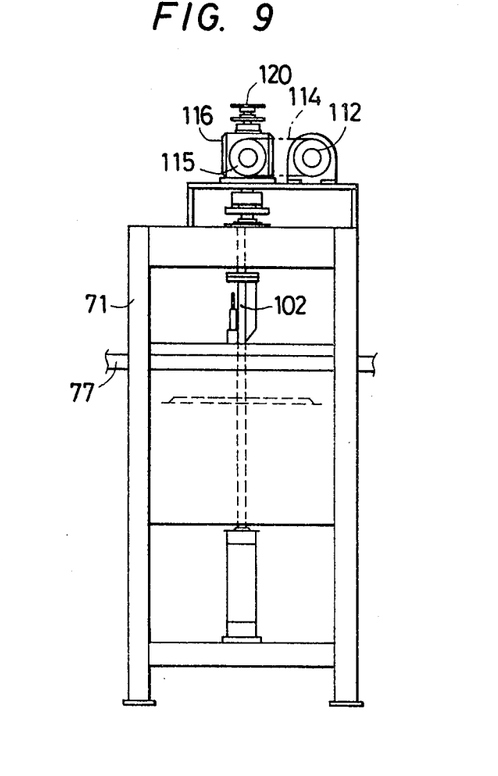

Referring back to FIGS. 7 through 9, two reference shafts 101 and 102 are vertically and rotatably connected to the frame 71. A head 103 at the lower end of the reference shafts 101 and 102 is bullet-shaped, and fits in the receiving cavity 97 in the three-piece claw 91. Connected to the lower end of the reference shafts 101 and 102 through a thrust bearing 104, the head 103 is rotatable with respect to the reference shafts 101 and 102 (see FIG. 10). The reference shafts 101 and 102 each carry a welding torch 107, with an electrode 108 on the welding torch 107 facing a joint 65 formed by the top head 61 and the closure flange 63.

A forwarding d.c. motor 111 and a reversing a.c. motor 112 to rotate the reference shafts 101 and 102 are mounted on top of the frame 71. The output side of the motors 111 and 112 is connected to a clutch brake 115 through belts 113 and 114, respectively. The output side of the clutch brake 115 is connected to a reduction gear 116 (see FIG. 12). The top end of the reference shaft 101 is connected to the reduction gear 116, too. Belt pulleys 117 and 118 are fixed, at the same level, to the reference shafts 101 and 102, and interlocked by a belt 119.

Figure 12:
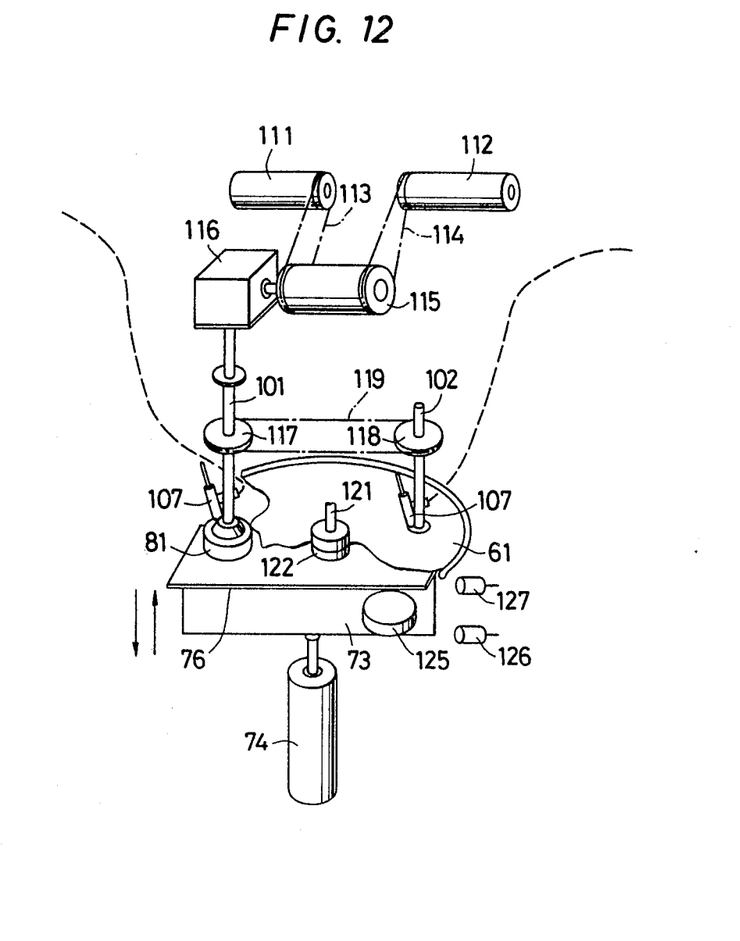
FIG. 12 is a perspective view of a drive system of the embodiment of FIG. 7.

To the lower end of a fixed shaft 121, suspended from the top of the frame 71, is fastened a top head keep plate 122 opposite to the top head support 78 (see FIGS. 7 and 12). As shown in FIG. 12, the frame 71 carries a sensor 125 (such as a photoelectric or proximity switch) to sense the top head 61 transferred by the carrying apparatus 67. The frame 71 carries sensors 126 and 127 to sense the upper and lower limits of the clamp table 73, too.

Figure 13:
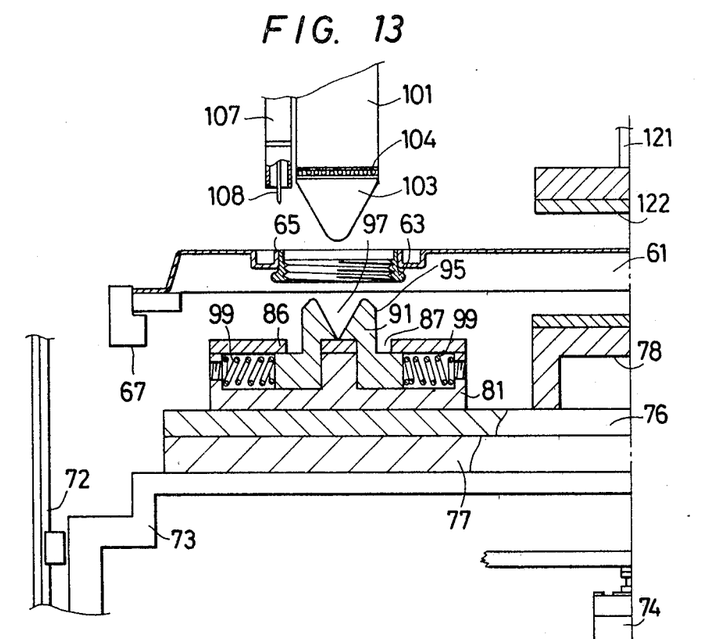
Figure 14:
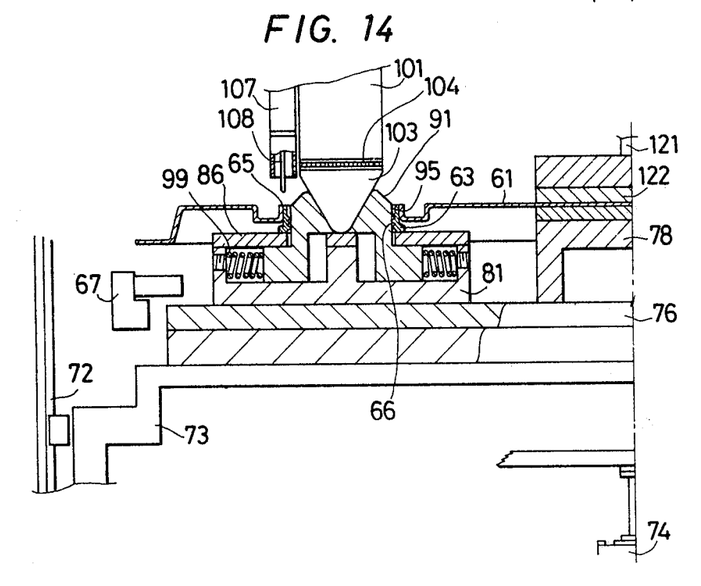

Referring now to FIGS. 13 and 14, the operation of the above-described welding apparatus will be described.

The carrying apparatus 67 delivers the top heads 61, to each of which the closure flange 63 has been fitted in the preceding process, to the welding apparatus at regular intervals. FIG. 13 shows the carrying apparatus 67 at a standstill, having supplied the top head 61 into the welding apparatus. In this state, the clamp table 73 is in the lower standby position, with the three-piece claw 91 on the clamp 81 pushed toward the center by the coil spring 99. The closure flange 63 lies approximately directly below the reference shaft 101, but is not exactly positioned yet.

Sensing the provisionally positioned top head 61, the sensor 125 (see FIG. 12) immediately transmits a signal for actuating the air cylinder 74 to raise the clamp table 73. With the elevation of the clamp table 73, the top head support 78 pushes up the top head 61 away from the carrying apparatus 67. On coming in contact with the top head keep plate 122, the top head 61 is held between the keep plate 122 and the top head support 78, as shown in FIG. 14. Then, the head 103 of the reference shaft 101 fits in the conical receiving cavity 97 in the three-piece claw 91 which is thereby expanded until the outside surface 95 thereof contacts the threaded surface 66 of the closure flange 63. The expanding three-piece claw 91 moves the dislocated top head 61 in all directions to put it in the exact position, so that the electrode 108 of the welding torch 107 properly faces the joint 65 between the top head 61 and the closure flange 63. When positioning has been accomplished, the welding torch 107 rotates about the reference shaft 101 to weld the annular joint 65.

On completion of welding, the clamp table 73 is lowered, and the welding torch 107 is reversed into the original position, ready for the next welding operation. The carrying apparatus 67 is re-operated to discharge the welded top head 61 and carry in the next top head 61.

Figure 15:
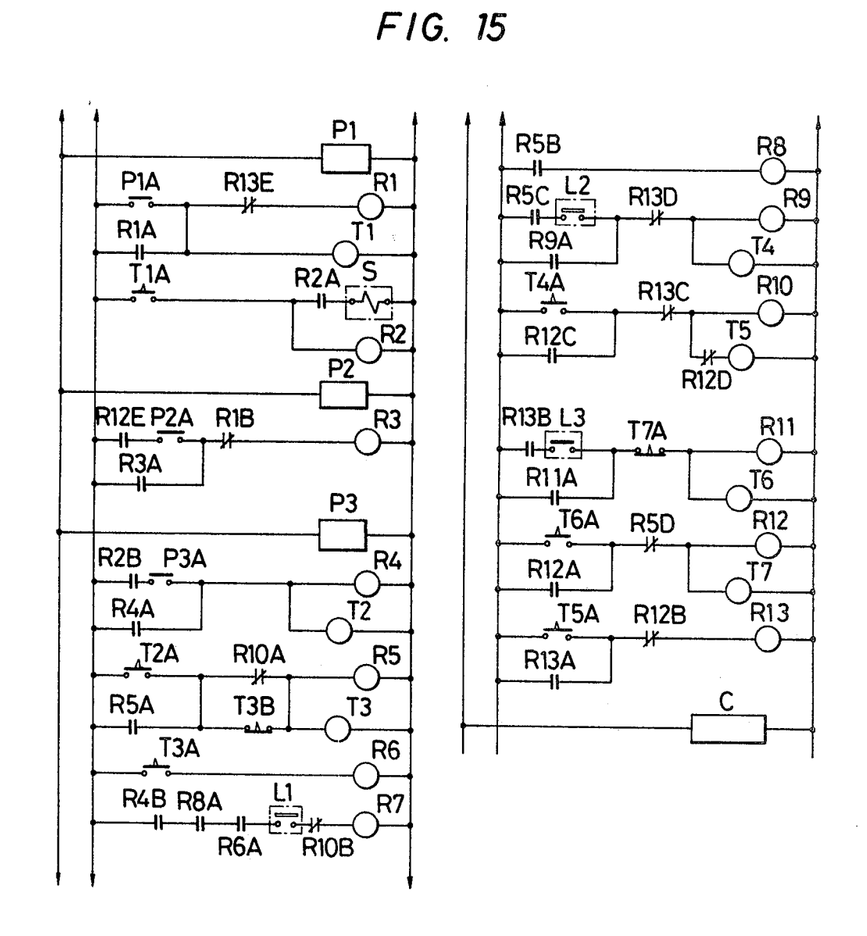
FIG. 15 is an automatic operation sequence chart of the embodied apparatus.

Now automatic operation of the above-described apparatus will be described by reference to a sequence chart in FIG. 15.

When the top head 61 reaches a predetermined position, a magnet coil P1 connected to the sensor 125 (a proximity switch) becomes energized to close a contact P1A thereof until the top head 61 clears the sensor 125. On clearance, the coil P1 becomes de-energized to open the contact P1A.

When the contact P1A closes, a coil R1 is energized to close a contact R1A and open a contact R1B, and actuate a timer T1 to close a contact T1A after a setting time. Then an energized coil R2 closes a contact R2A thereof, thus energizing a solenoid S of a solenoid valve (not shown) connected to the air cylinder 74. Consequently, the air cylinder 74 is operated to raise the clamp table 73. When the clamp table 73 reaches the upper limit, a coil P3 connected to the sensor 127 becomes energized to close a contact P3A thereof. With a contact R2B already closed, a coil R4 becomes energized to close a contact R4A and actuate a timer T2 to close a contact T2A after a setting time. Then a coil R5 becomes energized to close contacts R5A, R5B and R5C thereof, open a contact R5D, and actuate a timer T3 to close a contact T3A and open a contact T3B after a setting time. The closing of the contact R5B energizes a coil R8, thereby closing a contact R8A and a contact (not shown) in a control unit C. As a result, the reference shaft 101 rotates forward, interlocked with the forwarding d.c. motor 111, shown in FIG. 12, through the clutch brake 115.

On closing the contact T3A, a coil R6 becomes energized to close a contact R6A. With the contacts R4B and R3A closed, a cam 120 (see FIGS. 7 through 9) fastened to the reference shaft 101, which has started forward rotation, closes a welding arc generating limit switch L1 and energizes a coil R7 whose contact (not shown) is inserted in a switch circuit of a welding power supply. Consequently, welding of the joint 65 is started.

When the welding torch 107 fastened to the reference shaft 101 has made a circuit along the annular joint 65, the cam 120 closes the limit switch L1 to de-energize the coil R7, thereby stopping the welding. Immediately after this, a limit switch L2 closes. Then, with the contact R5C closed, a coil R9 becomes energized to close a contact R9A. A timer T4 actuates to close a contact T4A after a setting time, energize a coil R10, and actuate a timer T5. The energized coil R10 opens contacts R10A and R10B, as well as a clutch contact (not shown) in the control unit C. Then a clutch is actuated to disconnect the reference shaft 101 from the forwarding motor 111. At the same time, a brake contact (not shown) is closed to brake the rotation of the reference shaft 101.

After the setting time of the timer T5, a contact T5A closes to energize a coil R13, whereby contacts R13A and R13B close, and contacts R13C, R13D and R13E open to de-energize the coils R1 and R10. The energized coil R13 closes the clutch contact (not shown) in the control unit C to actuate the clutch, whereby the reference shaft 101 is interlocked with the reversing a.c. motor 112. Consequently, the reference shaft 101 is reversed to the original position, whereupon the cam 120 closes a limit switch L3. With the contact R13B closed, a coil R11 becomes energized to close a contact R11A, and actuate a timer T6 to close a contact T6A after a setting time. With the contact R5D closed when the contact R10A opened, a coil R12 becomes energized to close contacts R12A, R12C and R12E and open contacts R12B and R12D. Then a timer T7 functions to deenergize the coil R13, and open the clutch contact (not shown) in the control unit C. Consequently, the clutch functions to disconnect the reference shaft 101 from the reversing motor 112 and close the contact R13C.

When the contact R12C is closed, the coil R10 becomes energized to close a brake contact, whereupon brake is applied.

After the setting time of the timer T7, a contact T7A opens to de-energize the coil R11 and timer T6. That is, the contact R12C is opened and the contact R12D is closed while the reference shaft 101 is rotating forward. The contacts R13C and R13D in the forwarding circuit are opened while the reference shaft 101 is rotating backward. Accordingly, the forwarding and reversing circuits are interlocked.

When the contact R13E of the coil R13 opens to start reversing, the coil R1 and timer T1 reset themselves, thereby opening the contacts T1A and R2A, de-energizing the solenoid S, and lowering the clamp table 73. Midway in this descent, the carrying apparatus 67 receives the top head 61 for discharging out of the welding apparatus. The sensor 126 senses the clamp table 73 reaching the lower limit, then energizes a coil P2 to close a contact P2A. With the contacts R13E and R1B closed, a coil R3 becomes energized to close a contact R3A, thereby transmitting a signal to indicate the completion of the welding operation to the outside circuit.

Positioning may be accomplished by inserting the reference shaft directly in the opening in the closure flange, instead of placing the three-piece claw therebetween as in the above-described embodiment. The welding torch may be rotated about the stationary reference shaft, too.

As evident from the above, the method according to this invention puts the joint into the welding position by mating the opening in the closure flange with the reference shaft, and welds the joint between the top head and the closure flange by rotating the welding torch about the axis of the reference shaft. This permits accurate and quick positioning, and assures unfailing welding, keeping the welding torch in steady contact with the narrow annular joint. In addition, it facilitates automatic, since the positioning and welding operations consist of definitely separable steps.

What is claimed is:

1. Apparatus for manufacturing a metal container of light-gauge metal sheet, which comprises a container member having an inwardly projecting cylindrical neck formed along the periphery of a closure flange receiving opening and a closure flange adapted to receive a detachable plug, the closure flange being press-fitted in the receiving opening so that the neck and flange ends form a flushed annular face and fastened to a container wall, comprising:

an elevatable clamp table;

means for raising and lowering the clamp table;

a clamp fastened to the clamp table and having a collapsible claw, the claw expanding to fit in an opening in the closure flange press-fitted in the receiving opening in the container member;

a rotatable reference shaft having means at the lower end thereof, for entering and expanding the collapsible claw when the clamp table rises;

means for rotating the reference shaft; and a welding torch fastened to the reference shaft so as to face the annular face formed by the neck and flange bottoms.

* * * * *